United States Patent
Han et al.

(10) Patent No.: US 11,861,209 B2
(45) Date of Patent: Jan. 2, 2024

(54) MEMORY SYSTEM AND METHOD OF OPERATING THE SAME

(71) Applicant: SK hynix Inc., Icheon (KR)

(72) Inventors: Hyo Byung Han, Icheon (KR); Jin Woo Kim, Icheon (KR); Jin Won Jang, Icheon (KR); Young Wu Choi, Icheon (KR)

(73) Assignee: SK hynix Inc., Icheon (KR)

( * ) Notice: Subject to any disclaimer, the term of this patent is extended or adjusted under 35 U.S.C. 154(b) by 78 days.

(21) Appl. No.: 17/492,358

(22) Filed: Oct. 1, 2021

(65) Prior Publication Data

US 2022/0326873 A1    Oct. 13, 2022

(30) Foreign Application Priority Data

Apr. 9, 2021  (KR) .................. 10-2021-0046786

(51) Int. Cl.
*G06F 3/06* (2006.01)

(52) U.S. Cl.
CPC .......... *G06F 3/0655* (2013.01); *G06F 3/0619* (2013.01); *G06F 3/0679* (2013.01)

(58) Field of Classification Search
CPC .... G06F 3/0655; G06F 3/0619; G06F 3/0679; G06F 3/064; G06F 3/0688; G06F 11/07; G06F 11/14; G06F 11/1469; G06F 11/1448; G06F 12/0253; G06F 12/0292; G06F 12/1009; G06F 12/0246; G06F 2212/7201; G06F 2212/7205; G06F 2212/7211;

(Continued)

(56) References Cited

U.S. PATENT DOCUMENTS

| 8,555,141 B2 * | 10/2013 | Hicken | ................. G11C 16/04 |
| | | | 714/763 |
| 2016/0041891 A1 * | 2/2016 | Malshe | ............... G06F 11/1048 |
| | | | 714/704 |

(Continued)

FOREIGN PATENT DOCUMENTS

| KR | 1020180003320 A | 1/2018 |
| KR | 10-1884913 B1 | 8/2018 |

OTHER PUBLICATIONS

"NAND Flash 101: An Introduction to NAND Flash and How to Design it into Your Next Product", Jul. 2004, by Micron Technology, Inc., Technical Note TN-29-19, pp. 1-27 (Year: 2004).*

(Continued)

*Primary Examiner* — Curtis James Kortman

(57) ABSTRACT

A memory system includes a memory device, a system memory, and a controller. The memory device includes a page storing a first chunk including first user data and first meta data and a second chunk including second user data and second meta data. The system memory stores an address map table for a physical address of the page in which the first chunk and the second chunk are stored and a logical address mapped to the physical address. The controller is configured to perform a read operation of the page by recovering the first meta data using the physical address of the first chunk and the address map table, and outputting the second user data using the second meta data of the second chunk on which an error correction operation has passed, when an error correction operation on the first chunk has failed.

19 Claims, 10 Drawing Sheets

(58) Field of Classification Search
CPC . G06F 2212/7203; G11C 29/52; G11C 29/00; G11C 29/04
See application file for complete search history.

(56) References Cited

U.S. PATENT DOCUMENTS

| | | | |
|---|---|---|---|
| 2017/0315890 A1* | 11/2017 | Jibbe | G06F 11/2094 |
| 2019/0018601 A1* | 1/2019 | Dubeyko | G06F 3/0619 |
| 2019/0087089 A1* | 3/2019 | Yoshida | G06F 3/0658 |
| 2020/0089566 A1* | 3/2020 | You | G11C 16/26 |
| 2022/0180961 A1* | 6/2022 | Su | G11C 29/42 |

OTHER PUBLICATIONS

Jeong-Uk Kang et al., "A Superblock-based Flash Translation Layer for NAND Flash Memory", 2006, EMSOFT '06, ACM, pp. 161-170 (Year: 2006).*

* cited by examiner

FIG. 5A

|  | M_DATA |
|---|---|
| CK1 | 1st meta slice (LADD) |
| CK2 | 2nd meta slice |
| CK3 | 3rd meta slice |
| CK4 | 4th meta slice |
| CK5 | 5th meta slice |
| CK6 | 6th meta slice |
| CK7 | 7th meta slice |
| CK8 | 8th meta slice |
| ⋮ | ⋮ |
| CKi | $i^{th}$ meta slice |

FIG. 5B

|  | M_DATA |
|---|---|
| CK1 | 1st meta slice |
| CK2 | 2nd meta slice |
| CK3 | 3rd meta slice |
| CK4 | 4th meta slice |
| CK5 | 5th meta slice |
| CK6 | 6th meta slice (LADD) |
| CK7 | 7th meta slice |
| CK8 | 8th meta slice |
| ⋮ | ⋮ |
| CKi | $i^{th}$ meta slice |

MEMORY SYSTEM AND METHOD OF OPERATING THE SAME

CROSS-REFERENCE TO RELATED APPLICATION

The present application claims priority under 35 U.S.C. § 119(a) to Korean patent application number 10-2021-0046786 filed on Apr. 9, 2021, in the Korean Intellectual Property Office, the entire disclosure of which is incorporated by reference herein.

BACKGROUND

1. Field of Invention

The present disclosure relates to a memory system and a method of operating the same, and more particularly, to a memory system capable of performing address management, and a read operation of the memory system, and a method of operating the same.

2. Description of Related Art

A memory system may be configured to store data, output the stored data, or erase the stored data according to a request of a host. The memory system may include a memory device in which data is stored, a controller that controls the memory device, and a system memory that temporarily stores various information used in the memory system.

The memory device may be classified into a volatile memory device or a nonvolatile memory device. The volatile memory device is a memory device in which data is stored only when power is supplied and the stored data is lost when the supply of power is cut off. The volatile memory device may include a static random access memory (SRAM), a dynamic random access memory (DRAM), and the like. The nonvolatile memory device is a memory device in which data is not lost even though power is cut off, and may include a read only memory (ROM), a programmable ROM (PROM), an electrically programmable ROM (EPROM), an electrically erasable and programmable ROM (EEPROM), a flash memory, and the like.

The controller may be configured to control an overall operation of the memory system. The controller may output a command for a program, read, or erase operation according to the request of the host, and may output a command for the program, read, or erase operation to manage the memory device even though a request of the host does not exist.

The system memory may temporarily store an address used in the memory system, and may temporarily store data transmitted between the controller and the memory device during the program or read operation.

SUMMARY

An embodiment of the present disclosure provides a memory system capable of using data of a chunk in which an error does not exist or in which error correction is possible, by recovering meta data of a chunk in which the error correction is impossible during a read operation, and a method of operating the same.

According to an embodiment of the present disclosure, a memory system includes a memory device including a page storing a first chunk including first user data and first meta data and a second chunk including second user data and second meta data, a system memory storing an address map table for a physical address of the page in which the first chunk and the second chunk are stored and a logical address mapped to the physical address, and a controller configured to perform a read operation of the page wherein an error correction operation of the first chunk has failed by recovering the first meta data using the physical address of the first chunk and the address map table, and outputting the second user data using the second meta data of the second chunk on which an error correction operation has passed and the recovered first meta data.

According to an embodiment of the present disclosure, a method of operating a memory system includes reading a selected page of a memory device and outputting the read data as a plurality of chunks, performing an error correction operation on each of the plurality of chunks, determining that an error correction operation on a first chunk of the plurality of chunks has failed when a number of error bits included in the first chunk is greater than an allowed number of error bits, determining whether to proceed with a recovery operation on meta data of the first chunk and in response to determining to proceed with the recovery operation detecting a logical address mapped to a physical address of the first chunk and outputting data corresponding to a second chunk of the plurality of chunks on which the error correction operation has passed.

According to an embodiment of the present disclosure, a method of operating a memory system includes generating and storing an address map table by mapping a physical address for a region in which data is to be programmed to a logical address during a program operation, programming the data in a selected page of a memory block selected according to the physical address, reading a plurality of chunks of the selected page and performing an error correction operation on each chunk of the read data, when a read operation of the selected page is performed and when an error correction operation on a first chunk of the plurality of chunks has failed checking whether the logical address is included in meta data stored in the first chunk, detecting the logical address mapped to the physical address of the first chunk in the address map table, when the logical address is included in the meta data stored in the first chunk and recovering the meta data for the data stored in the selected page by combining the detected logical address with remaining meta data stored in a second chunk of the plurality of chunks when the error correction operation on the second chunk has passed.

The present technology may extract usable data from a page in which error correction has failed during a read operation.

BRIEF DESCRIPTION OF THE DRAWINGS

FIGS. 5A and 5B illustrate meta data stored in chunks.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and should not be construed as being limited to the embodiments described in the present specification or application.

Figure 1:
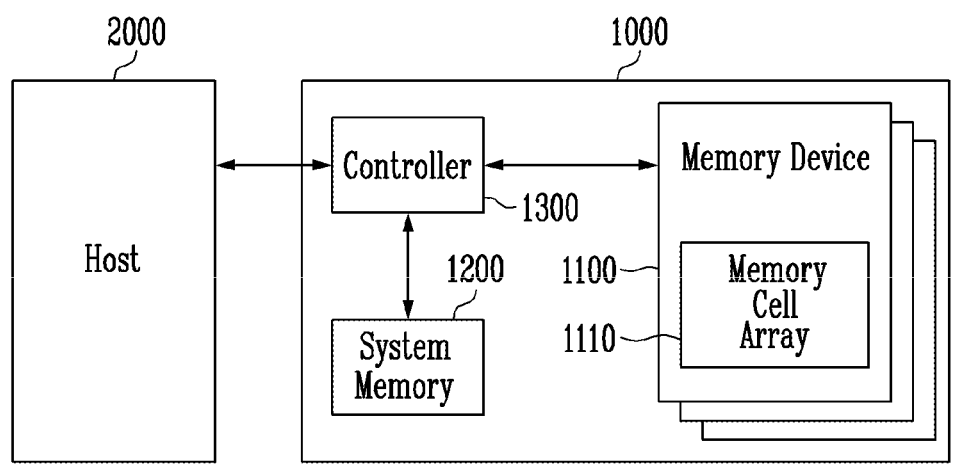
FIG. 1 illustrates a memory system according to an embodiment of the present disclosure.

FIG. 1 illustrates a memory system 1000 according to an embodiment of the present disclosure.

The memory system 1000 may be configured to store data, output the stored data to a host 2000, or erase the stored data, in response to a request of the host 2000.

The host 2000 may be an electronic device such as a mobile phone or a computer, or may be a processor used in an electronic device.

The memory system 1000 may include a memory device 1100 in which data is stored, a system memory 1200 configured to store information used in the memory system 1000, and a controller 1300 configured to control the memory device 1100 and the system memory 1200.

The memory device 1100 may include a memory cell array 1110 configured to store data, and may further include peripheral circuits (not shown) configured to perform a program, read, or erase operation under control of the controller 1300.

The system memory 1200 may be configured to temporarily store information used in the memory system 1000. For example, the system memory 1200 may store mapping information between addresses used in the host 2000 and addresses used in the memory device 1100, respectively, and temporarily store data transmitted between the controller 1300 and the memory device 1100. In embodiments of the memory system 1000, the system memory 1200 may include a volatile memory for a fast speed operation, a nonvolatile memory, or both. For example, the volatile memory may be a dynamic random access memory (DRAM) or a static random access memory (SRAM), and the nonvolatile memory may be an electrically erasable and programmable ROM (EEPROM), a NAND flash memory, a NOR flash memory, a phase-change RAM (PRAM), a resistive RAM (ReRAM), a ferroelectric RAM (FRAM), or a spin transfer torque-magnetic RAM (STT-MRAM).

The controller 1300 may be configured to control the memory device 1100 and the system memory 1200 according to requests of the host 2000. The controller 1300 may be configured to control transmission of data between the host 2000, the memory device 1100, and the system memory 1200. The controller 1300 may map a logical address used in the host 2000 and a physical address used in the memory device 1100 to each other, and may change the mapped addresses. The controller 1300 may store the mapped address in the system memory 1200 and may find or change the address stored in the system memory 1200. In addition, the controller 1300 may be configured to activate a background mode for efficiently managing the memory device 1100, and execute various operations such as garbage collection or wear leveling in the background mode, when a request of the host 2000 is not being processed.

The controller 1300 may be configured to transmit a read command to the memory device 1100, and detect and correct an error in data output from the memory device 1100, when performing the read operation according to a read request of the host 2000, garbage collection, wear leveling, or read reclaim.

In general, when the number of error bits in data read from the memory device 1100 is greater than an allowed number of error bits for that data, the controller may determine the read operation of the read data has failed and process the read data as invalid data. That is, in general, when the read operation has failed, the controller does not output the read data. For example, in a memory system of the related arts, a page of data in the memory device 1100 includes a plurality of chunks, the allowed number of error bits applies to each chunk, and a read of the page of memory will be determined to have failed if any chunk of the page has more error bits than the allowed number of error bits. Such a memory system may not output any data from the page when the read operation is determined to have failed.

The controller 1300 according to the present embodiment may be configured to use usable data from among the data read from the selected page even though the read operation of the selected page is determined to have failed when performing garbage collection or wear leveling.

Figure 2:
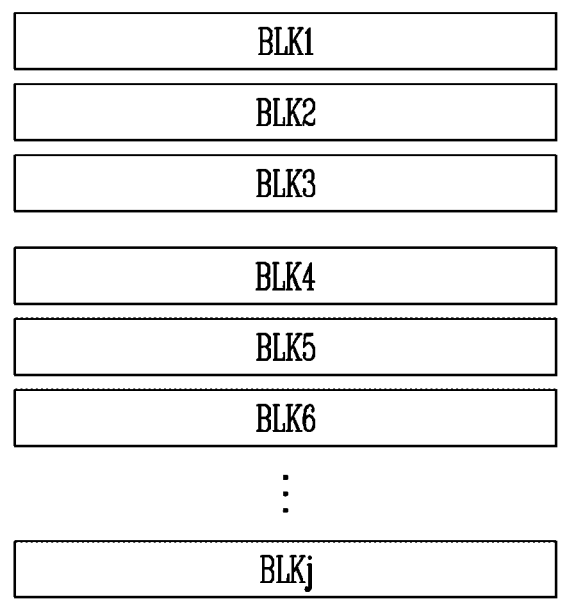
FIG. 2 illustrates a memory cell array.

FIG. 2 illustrates the memory cell array 1100.

The memory cell array 1110 may include first to j-th memory blocks BLK1 to BLKj (j is a positive integer greater than 1). Each of the first to j-th memory blocks BLK1 to BLKj may include a plurality of memory cells in which data may be stored. The first to j-th memory blocks BLK1 to BLKj may be respectively associated with first to j-th physical addresses.

During the program, read, or erase operation, one memory block may be selected from among the first to j-th memory blocks BLK1 to BLKj according to the associated physical address, and the program, read, or erase operation on the selected memory block may be performed.

Figure 3:
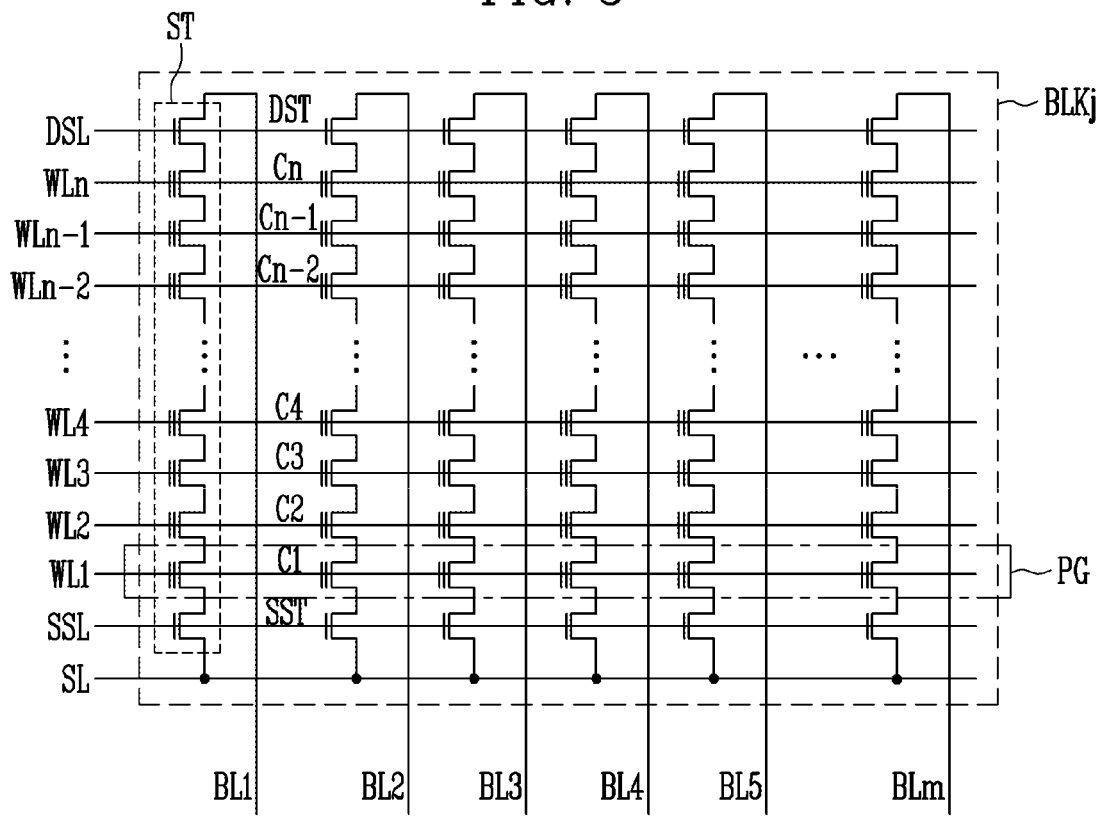
FIG. 3 illustrates a memory block.

FIG. 3 illustrates the j-th memory block BLKj.

Because the first to j-th memory blocks BLK1 to BLKj shown in FIG. 2 are configured identically to each other, the j-th memory block BLKj is shown in FIG. 3 as an example.

The j-th memory block BLKj may include a plurality of strings ST connected between respective first to m-th bit lines BL1 to BLm and a source line SL. Each of the strings ST may include a source select transistor SST, first to n-th memory cells C1 to Cn, and a drain select transistor DST connected in series between the source line SL and the respective bit line of the first to m-th bit lines BL1 to BLm (m is a positive integer).

While the j-th memory block BLKj shown in FIG. 3 illustrates one possible configuration of the memory block, the number of source select transistors SST, number of first to n-th memory cells C1 to Cn, and number of drain select transistors DST is not limited to the numbers shown in FIG. 3.

Gates of the source select transistors SST connected to different strings may be commonly connected to a source select line SSL, gates of each of the first to n-th memory cells C1 to Cn of the different strings may be commonly connected to first to n-th the word lines WL1 to WLn, and gates of the drain select transistors DST connected to the different strings may be commonly connected to a drain select line DSL.

Memory cells connected to the same word line and included in different strings ST may configure a page PG, and the program operation and the read operation may be performed in a unit of the page PG. For example, during the read operation, the read operation may be performed on a selected page included in a selected memory block according to a physical address.

Figure 4:
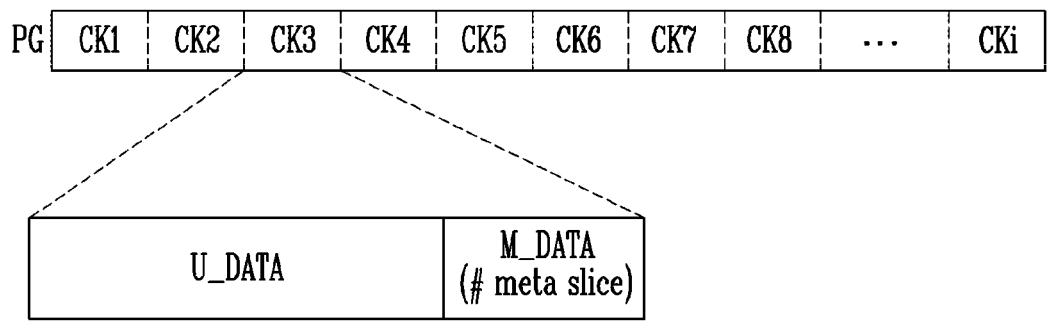
FIG. 4 illustrates a page included in the memory block.

FIG. 4 illustrates the page PG included in the memory block.

Because the page PG includes the plurality of memory cells connected to the same word line, a storage capacity of the page PG may be determined according to the number of memory cells. During the read operation, the memory cells may be selected in the unit of the page PG, but data of the memory cells may be read in a chunk unit as the number of memory cells included in the page PG increases. The chunk may be defined as a group of memory cells having a number of bits less than that of the page PG. Therefore, the memory device may output data read from the page PG to the controller in the chunk unit, and the controller may perform error detection and correction of the data received on a chunk-by-chunk basis.

For example, the memory cells included in the page PG may be divided into first to i-th chunks CK1 to CKi. User data U_DATA and meta data M_DATA may be stored in each of the first to i-th chunks CK1 to CKi. The user data U_DATA may be data transmitted by the host during the program operation and may be unique to each chunk, and the meta data M_DATA may be data generated by the controller to manage the memory system. For example, the controller may divide the meta data M_DATA generated during the program operation according to a meta slice unit, and store the divided meta slices in the first to i-th chunks CK1 to CKi, respectively. For example, user data U_DATA for the first chunk CK1 of the page PG and a first meta slice 1st meta slice may be stored in the first chunk CK1, user data U_DATA for the second chunk CK2 and a second meta slice 2nd meta slice may be stored in the second chunk CK2, and user data U_DATA for the third chunk CK3 and a third meta slice 3rd meta slice may be stored in the third chunk CK3. Accordingly, the user data U_DATA and the meta data M_DATA divided into i may be stored in the first to i-th chunks CK1 to CKi, respectively. In embodiments, the first to i-th chunks CK1 to CKi may also include respective Error Correction Code (ECC) bits (not shown) configured for the detection and correction of bit errors in the respective chunk. In other embodiments, the ECC bits for each chunk may be included in a spare area (not shown) of the page PG.

The different meta slices may include different information. The meta data M_DATA including the meta slices is described in more detail with reference to FIGS. 5A and 5B.

FIGS. 5A and 5B illustrate the meta data stored in the chunks.

Referring to FIG. 5A, when the page is divided into the first to i-th chunks CK1 to CKi, the meta data M_DATA may be divided into i meta slices and stored in the respective chunks.

For example, the first meta slice stored as the meta data M_DATA in the first chunk CK1 may include a logical address LADD of the data stored in the selected page. The logical address LADD may be the address used in the host and may be an address transmitted by the host to the controller during the program operation. For example, the address used in the host may be the logical address LADD, and the address used in the memory system may be the physical address. The logical address LADD may be stored in a format such as a logical page number designated by the host.

The meta slices stored as the meta data M_DATA in the second to i-th chunks CK2 to CKi may include various information related to the program operation of the selected page or information related to the data stored in the selected page. For example, the meta slices stored as the meta data M_DATA in the second to i-th chunks CK2 to CKi may include a bitmap related to the data stored in the selected page. The bitmap may indicate a data structure of the data stored in the selected page.

The chunk in which the logical address LADD is stored may be preset according to the memory system. For example, as shown in FIG. 5A, in a memory system in which the chunk storing the logical address LADD is set as the first chunk CK1, the logical address LADD associated with a page may be stored in the first chunk CK1 of that page during the program operation for that page.

As shown in FIG. 5B, the chunk in which the logical address LADD is stored may be a chunk other than the first chunk CK1. For example, in a memory system configured to store the logical address LADD in the sixth chunk CK6, the logical address LADD associated with a page may be stored in the sixth chunk CK6 of that page during the program operation for that page.

Figure 6:
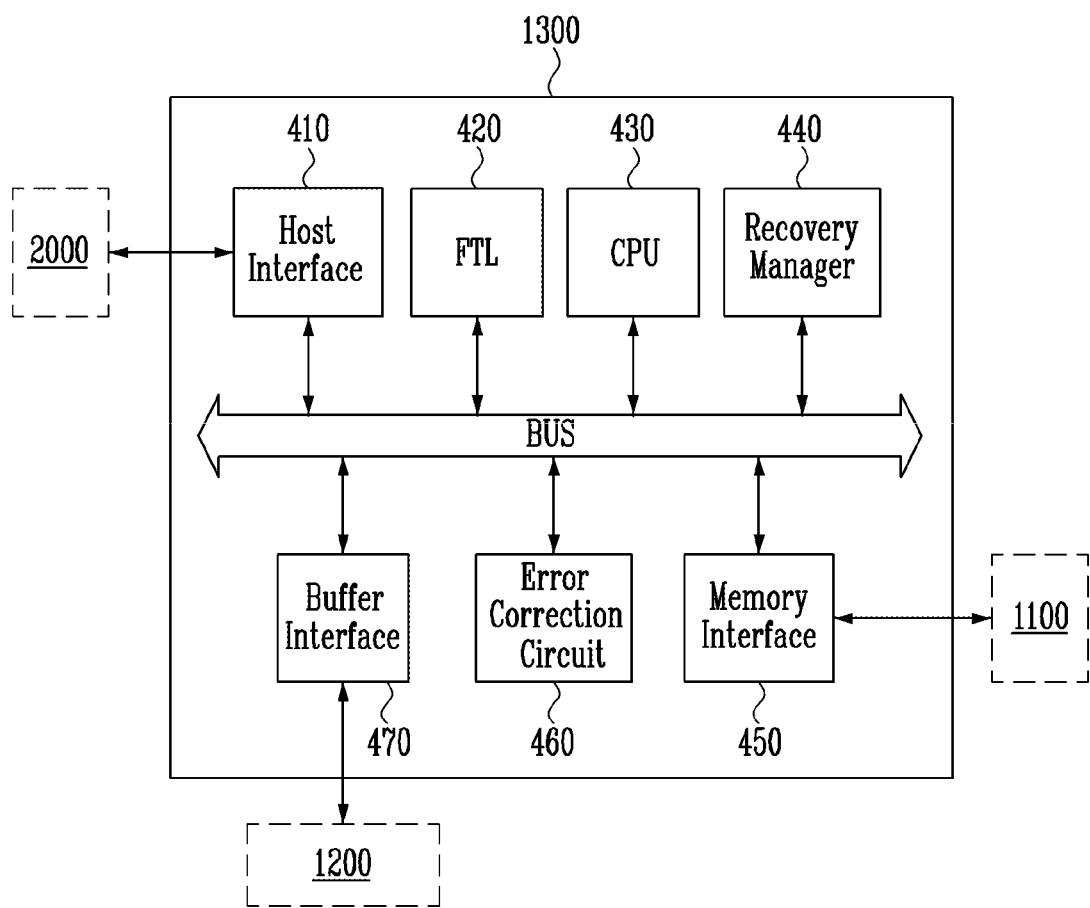
FIG. 6 illustrates a controller according to an embodiment of the present disclosure.

FIG. 6 illustrates a controller according to an embodiment of the present disclosure.

Referring to FIG. 6, the controller 1300 may include a host interface 410, a flash translation layer FTL 420, a central processing unit (CPU) 430, a recovery manager 440, a memory interface 450, an error correction circuit 460, and a buffer interface 470.

The host interface 410, the flash translation layer 420, the CPU 430, the recovery manager 440, the memory interface 450, the error correction circuit 460, and the buffer interface 470 may exchange information through a bus. The CPU 430 may control the host interface 410, the flash translation layer 420, the recovery manager 440, the memory interface 450, the error correction circuit 460, and the buffer interface 470, in response to a request of the host 2000 or in the background mode.

The host interface 410 may be configured to transmit information between the host 2000 and the controller 1300. For example, during the program operation, the host interface 410 may receive a program request, a logical address, and data output from the host 2000, transmit the program request to the CPU 430, and transmit the logical address and the data to the buffer interface 470 under control of the CPU 430. During the read operation, the host interface 410 may receive a read request and the logical address from the host 2000 and may output data read from the memory device to the host 2000.

The flash translation layer 420 may be configured to perform various functions for optimizing the memory device 1100. For example, the flash translation layer 420 may be configured to perform address mapping, garbage collection, wear leveling, or the like. Address mapping is a function of mapping the logical address used in the host 2000 and the physical address used in the memory device 1100 to each other. Garbage collection is a function for collecting valid data stored in a plurality of memory blocks of the memory device 1100 into one memory block and erasing invalid data stored in remaining memory blocks. Wear leveling is a function for evenly distributing a use frequency of the memory blocks included in the memory device 1100. For example, since the erase operation of the memory block in which the invalid data is stored is not performed simultaneously when wear leveling is performed, garbage collection may be performed when the number of free blocks is decreased due to wear leveling being performed. In addition, the flash translation layer 420 may be configured to further perform functions such as trimming or over provisioning in order to optimize the memory device 1100.

The CPU 430 may be configured to generally control devices included in the controller 1300, and may perform various operations required by the memory system during the program, read, or erase operation. In addition, the CPU 430 may convert various requests of the host 2000 into commands and transmit the commands to the memory device 1100 to control the memory device 1100. For example, when the host 2000 transmits the program request, the CPU 430 may convert the program request into a program command and transmit the program command to the memory device 1100. When the host 2000 transmits the read request, the CPU 430 may convert the read request into a read command and transmit the read command to the memory device 1100. The CPU 430 may also generate a program, read, or erase command according to a request of the flash translation layer 420 in the background mode, and transmit the generated program, read, or erase command to the memory device 1100. In addition, the CPU 430 may generate the commands for performing the program, read, or erase operation even though the request of the host 2000 does not exist when a condition governing whether wear leveling or garbage collection is to be performed is satisfied.

The recovery manager 440 may be configured to determine whether the read operation has passed or failed. For example, the recovery manager 440 may determine whether the read operation has passed or failed according to a signal output from the error correction circuit 460. The recovery manager 440 may be configured to determine whether recovery is possible according to the meta data among the data received from the memory device 1100 when it is determined that the read operation has failed. For example, the recovery manager 440 may be configured to recover the meta data using the information stored in the system memory 1200 when the meta data of the chunk on which the read operation has failed included the logical address. More specifically, the recovery manager 440 may determine whether the meta data of the chunk on which the error correction operation has failed included the logical address, and when it is determined that the logical address was included, the recovery manager 440 may find the logical address mapped to the physical address of the chunk on which the error correction operation has failed, using the information stored in the system memory 1200. The recovery manager 440 may thereby recover the entire meta data of the data stored in the selected page by combining the found logical address with the meta data of the chunks on which the error correction operation has passed.

Subsequently, the recovery manager 440 may output the data stored in the chunks on which the error correction operation has passed, using the recovered meta data. Since the recovery manager 440 performs a function of managing the memory device 1100, the recovery manager 440 may be included in the flash translation layer 420 according to the controller 1300.

The memory interface 450 may be configured to transmit information between the controller 1300 and the memory device 1100. For example, the memory interface 450 may be configured to transmit the program command, the physical address, and the data received through the bus to the memory device 1100 during the program operation. The data transmitted to the memory device 1100 may include the user data and the meta data. The memory interface 450 may be configured to transmit the data received from the memory device 1100 during the read operation to the buffer interface 470 through the bus.

The error correction circuit 460 may be configured to perform an error correction encoding operation on the data received from the host interface 410 during the program operation and perform an error correction decoding operation on the data received from the memory device 1100 through the memory interface 450 during the read operation. During the error correction decoding operation, the error correction circuit 460 may perform the error correction decoding operation on the data received on a per-chunk basis; that is, separately for each chunk of the received data. When an error is detected in a chunk of the received data, the error correction circuit 460 may compare the number of error bits detected in that chunk with the allowed number of error bits, and when the number of error bits detected is less than or equal to the allowed number of error bits, the error correction circuit 460 may output a pass signal indicating the read operation of that chunk has passed. When the number of error bits detected in a chunk is greater than the allowed number of error bits, the error correction circuit 460 may output a fail signal indicating that the read operation of that chunk has failed. The recovery manager 440 may determine that the read operation is passed in response to the pass signal output for the chunks of the received data, and may perform a recovery operation in response to the fail signal output for one of the chunks of the received data.

The buffer interface 470 may be configured to transmit information between the controller 1300 and the system memory 1200. For example, the buffer interface 470 may be configured to transmit addresses or data transmitted through the bus to the system memory 1200, and configured to transmit addresses or data stored in the system memory 1200 to the bus.

Figure 7:
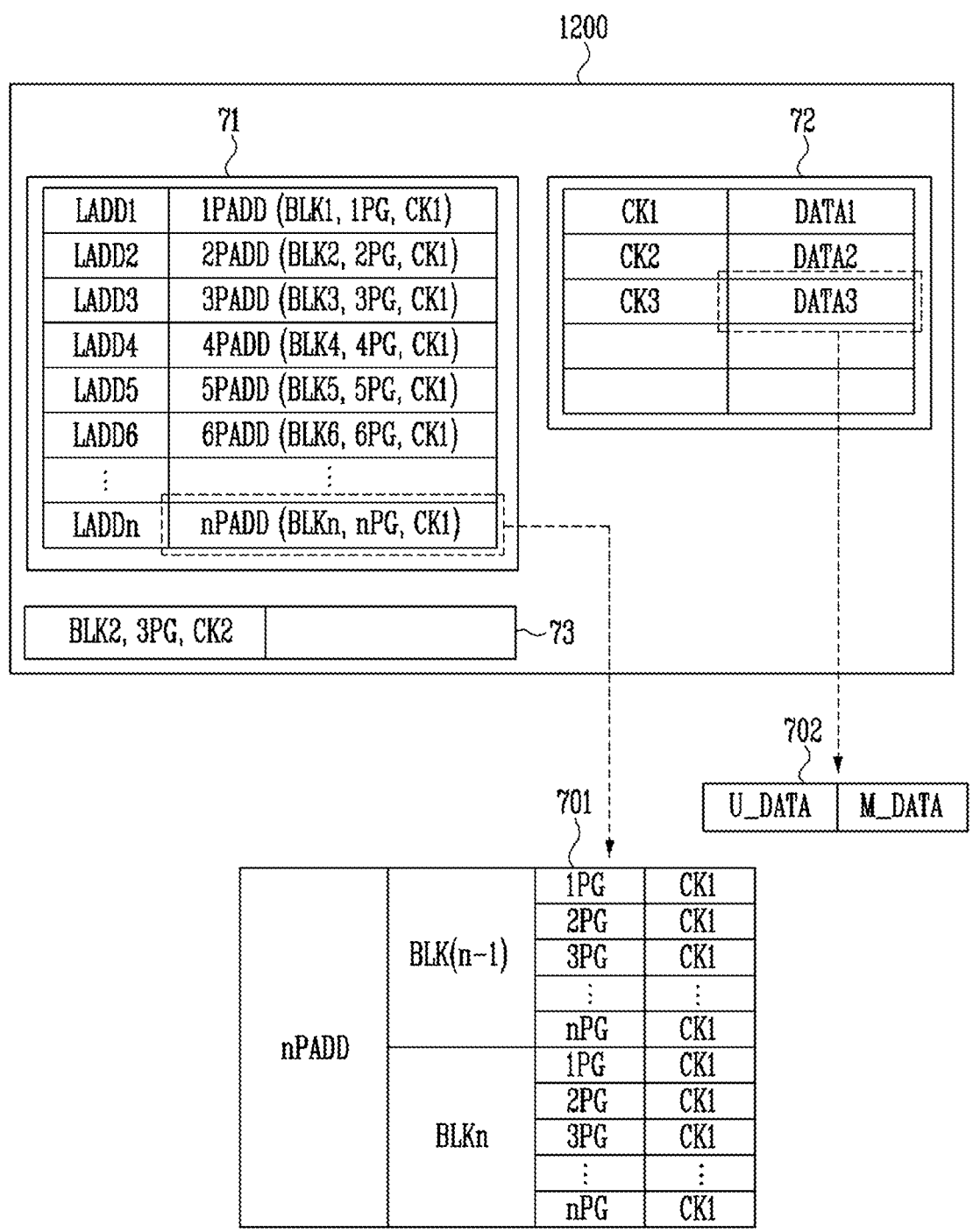
FIG. 7 illustrates a system memory according to an embodiment of the present disclosure.

FIG. 7 illustrates a system memory according to an embodiment of the present disclosure.

Referring to FIG. 7, the system memory 1200 may include an address map buffer 71, a data buffer 72, and an error information buffer 73.

The address map buffer 71 may store an address map table for logical addresses LADD1 to LADDn and physical addresses 1PADD to nPADD. For example, assuming that the first physical address 1PADD is mapped to the first logical address LADD1 by the flash translation layer 420 of FIG. 6 during the program operation, the mapping of the first physical address 1PADD to the first logical address LADD1 may be stored in the address map buffer 71. The physical address stored in the address map buffer 71 may include the address of the memory block in which data is stored and the address of the page, and (in some embodiments) the address of the chunk in which the logical address is stored in each page. For example, the first physical address 1PADD may include an address of the first memory block BLK1 in which data is stored, an address of a first page 1PG, and an address of the first chunk CK1 in which the first logical address is stored among the chunks included in the first page 1PG. That is, the n-th physical address nPADD mapped to the n-th logical address LADDn may include an address of the n-th memory block BLKn in which data corresponding to the n-th logical address LADDn is stored, an address of an n-th page nPG included in the n-th memory block BLKn, and an address of the first chunk CK1 in which the n-th logical address LADDn is stored among the chunks included in the n-th page nPG. In other embodiments wherein the chunk of the page that stores the logical address is predetermined, chunk addresses may not be included in the address map table.

During the program operation, when a capacity of data corresponding to the logical address is greater than a capacity of one memory block, the physical address may include addresses of a plurality of memory blocks, addresses of a plurality of pages, and addresses of the chunks in which the logical address is stored in each page, as shown in physical address 701. For example, when a capacity of the data corresponding to the n-th logical address LADDn is a capacity stored in two memory blocks, the n-th physical address nPADD may include an address of the (n−1)-th memory block BLK(n−1) and an address of the n-th memory block BLKn in which data is stored, addresses of first to n-th pages 1PG to nPG included in each of the (n−1)-th and n-th memory blocks BLK(n−1) and BLKn, and an address of the first chunk CK1 in which the n-th logical address LADDn is stored in each of the first to n-th pages 1PG to nPG.

In the diagram shown in FIG. 7, all chunks in which the logical address is stored in each of the pages are at the same relative address within their respective pages (here, the first chunk), but the chunks in which the logical address is stored may be different according to the memory block or the page, or may be different according to the memory block and the page. The address of the chunk in which the logical address is stored may be determined according to an algorithm set in the flash translation layer 420. Therefore, in some embodiments, during the program operation, the flash translation layer 420 may store, in the address map buffer 71, the address of the chunk in which the logical address is stored for each page according to the physical address in which data is stored.

The data buffer 72 may be configured to temporarily store the data read from the memory device. The data buffer 72 may divide and store the data read from the selected page according to the chunk unit. For example, assuming that first to third chunks are included in the selected page during the read operation, in the data buffer 72, first data DATA1 read from the first chunk CK1, second data DATA2 read from the second chunk CK2, and third data DATA3 read from the third chunk CK3 may be stored to be divided according to each chunk. The data stored in the data buffer 72 may include the user data U_DATA and the meta data M_DATA read from each chunk, as shown for chunk 702.

The error information buffer 73 may be configured to store addresses of the page and the chunks on which the read operation has failed during the read operation of the selected memory block. For example, when failure occurs in the second chunk CK2 of the third page 3PG during the read operation of the second memory block BLK2, the recovery manager 440 of FIG. 6 may store the addresses of the second memory block BLK2 in which the failure occurred, the third page 3PG of the second memory block BLK2, and the second chunk CK2 of the third page 3PG in the error information buffer 73. The addresses stored in the error information buffer 73 may be used in a next program operation or read operation. For example, during the next program operation, the controller may control the program operation so that dummy data is stored in a page corresponding to the address stored in the error information buffer 73. Alternatively, the controller may control the read operation so that a read voltage is adjusted during the next read operation corresponding to the address stored in the error information buffer 73. In addition, the controller may perform garbage collection or wear leveling using the information stored in the error information buffer 73 when the controller is in the background mode.

Figure 8:
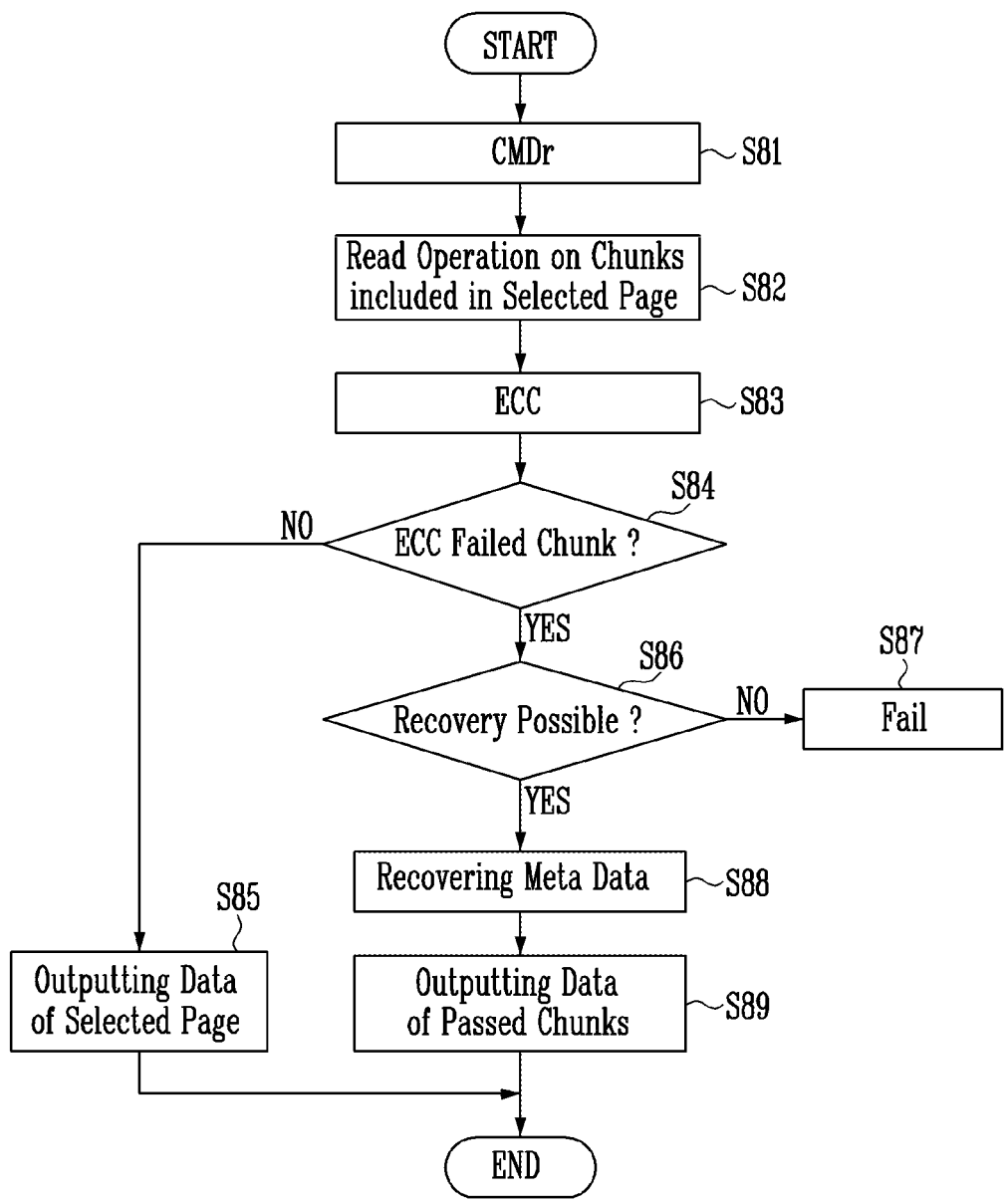
FIG. 8 illustrates operation of a memory system according to an embodiment of the present disclosure.

FIG. 8 illustrates operation of a memory system according to an embodiment of the present disclosure.

Referring to FIGS. 6 and 8, during an operation performed without being provided with the logical address corresponding to the data stored in the selected page, the controller 1300 may recover the logical address corresponding to the selected page through the meta data stored in the selected chunk of the selected page, and perform the operation using the recovered logical address. For example, when wear leveling, garbage collection, or read reclaim is performed, the controller 1300 may output a read command CMDr to the memory device 1100 (S81). When outputting the read command CMDr, the controller 1300 may also output the selected physical address.

The memory device 1100 may perform the read operation in response to the read command CMDr and the physical address (S82). For example, the memory device 1100 may output the data read from the selected page to the controller 1300 in the chunk unit.

The controller 1300 may perform the error correction operation using the data of each chunk unit received from the memory device 1100 and an error correction code (ECC) corresponding to each chunk unit to determine the number of error bits in each chunk unit (S83). Here, the error correction operation may be the error correction decoding operation.

The controller 1300 may determine whether a chunk for which the error correction operation has failed exists according to a result of the error correction operation (S84). For example, when the number of error bits detected in a selected chunk is less than or equal to the allowed number of error bits (path NO out of S84), the controller 1300 may determine that the error correction operation of the selected chunk has passed. When the error correction operations of all chunks included in the selected page have passed, the data of the selected page may be output after correcting any error detected in each of the chunks (S85).

In step S84, when the number of fail bits detected in the selected chunk is greater than to the allowed number of fail bits (path YES out of S84), the controller 1300 may determine whether the meta data may be recovered based on the data of the chunk in which the fail occurs (S86). For example, when the logical address corresponding to the selected page is not included in the meta data of the chunk on which the error correction operation is failed (path NO out of S86), the controller 1300 may process the read operation of the selected page as having failed (S87).

In step S86, when the logical address of the selected page is included in the meta data of the chunk on which the error correction operation is failed (path YES out of S86), the controller 1300 may recover the meta data of the selected page (S88). For example, the controller 1300 may recover the meta data by finding the logical address mapped to the physical address of the failed chunk in the address map table stored in the system memory 1200. More specifically, when a fail occurs in the chunk in which the logical address is stored among the plurality of chunks of the selected page, the logical address information is lost, and thus the meta data for the selected page is not complete. In this case, since the logical address mapped to the physical address for the failed chunk may be found in the system memory 1200, when the meta slices of the passed chunks and the logical address found in the system memory 1200 are combined, the entire meta data for the selected page may be recovered.

When the meta data including the logical address is recovered, the controller 1300 may output the data corresponding to the logical address and the chunk on which the error correction operation is passed, from among each of the chunks stored in the system memory 1200 (S89).

That is, in memory systems of the related arts, during the read operation of a selected page, when the error correction operation is failed in any one of the chunks included in the selected page, the entire read operation of the selected page may be processed as having failed, and thus the data stored in the selected page may not be used.

However, according to the present embodiment, even though the chunk on which the error correction operation is failed occurs among the chunks included in the selected page, when logical address data is included in the meta data of the failed chunk, the controller 1300 may use data corresponding to the chunks of the selected page on which the error correction operation has passed. For example, the controller 1300 may recover the logical address based on the information stored in the system memory 1200 and use the data corresponding to the chunks on which the error correction operation is passed among the data corresponding to the recovered logical address.

In addition, the controller 1300 may store the physical address of the chunk on which the error correction operation has failed in the system memory 1200 and may use the physical address when setting operation conditions during the next program or read operation.

Figure 9:
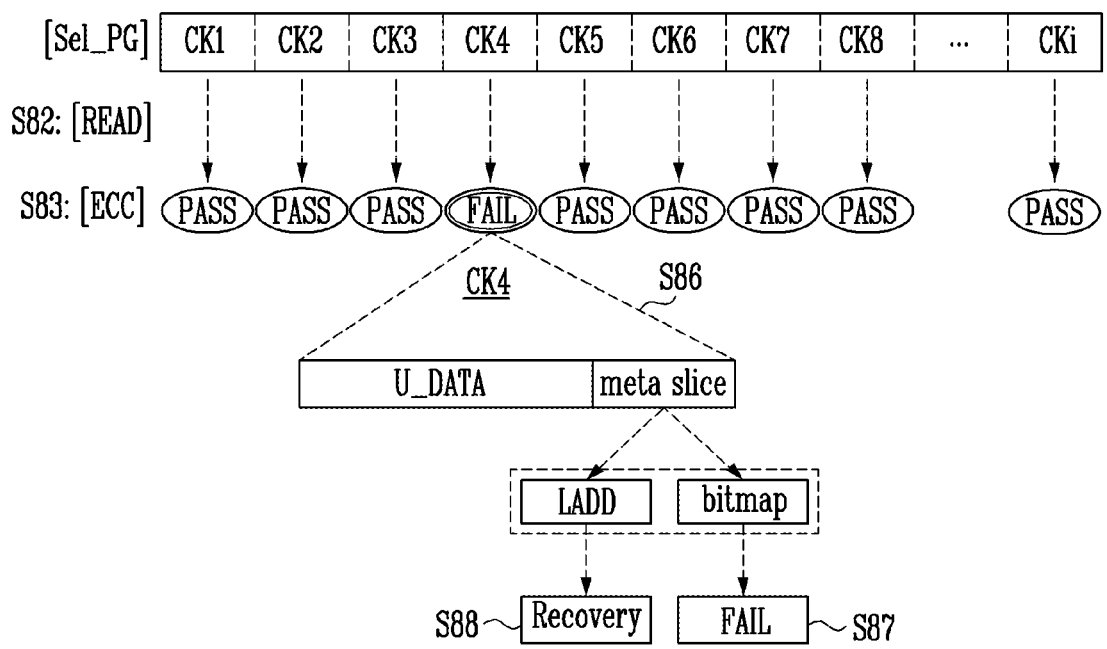
FIG. 9 illustrates operations on a chunk unit according to an embodiment of the present disclosure.

FIG. 9 illustrates operations on a chunk unit according to an embodiment of the present disclosure, and steps S82 to S88 described with reference to FIG. 8 are shown more specifically.

Referring to FIGS. 8 and 9, during a read operation of a selected page Sel_PG, the memory device 1100 may perform the read operation of the selected page Sel_PG and output read data in a units of first to i-th chunks CK1 to CKi, respectively (S82).

The controller 1300 may perform an error correction operation on data in each of the chunk units received from the memory device 1100 (S83). For example, the error correction circuit 460 of FIG. 6 included in the controller 1300 may perform an error correction operation on the data read from the first chunk CK1, and output a result of the error correction operation as a pass signal or a fail signal. In this way, a result of an error correction operation on data received from each of the first to i-th chunks CK1 to CKi may be output.

When the error correction operation on the data of the fourth chunk CK4 among the data of the first to i-th chunks CK1 to CKi has failed, the recovery manager 440 of FIG. 6 included in the controller 1300 may determine whether the logical address LADD is stored in the meta slice included in the fourth chunk CK4 among the meta data of the selected page, and determine whether recovery is possible according to a result of that determination (S86).

For example, when the logical address LADD is not included and a bitmap is included in the meta slice of the fourth chunk CK4, the recovery manager 440 may determine that the read operation the selected page has failed (S87). In contrast, when the logical address LADD is included in the meta slice of the fourth chunk CK4, the recovery manager 440 may recover the meta data of the selected page (S88), and output the data corresponding to the chunks of the selected page on which the error correction operation has passed.

Figure 10:
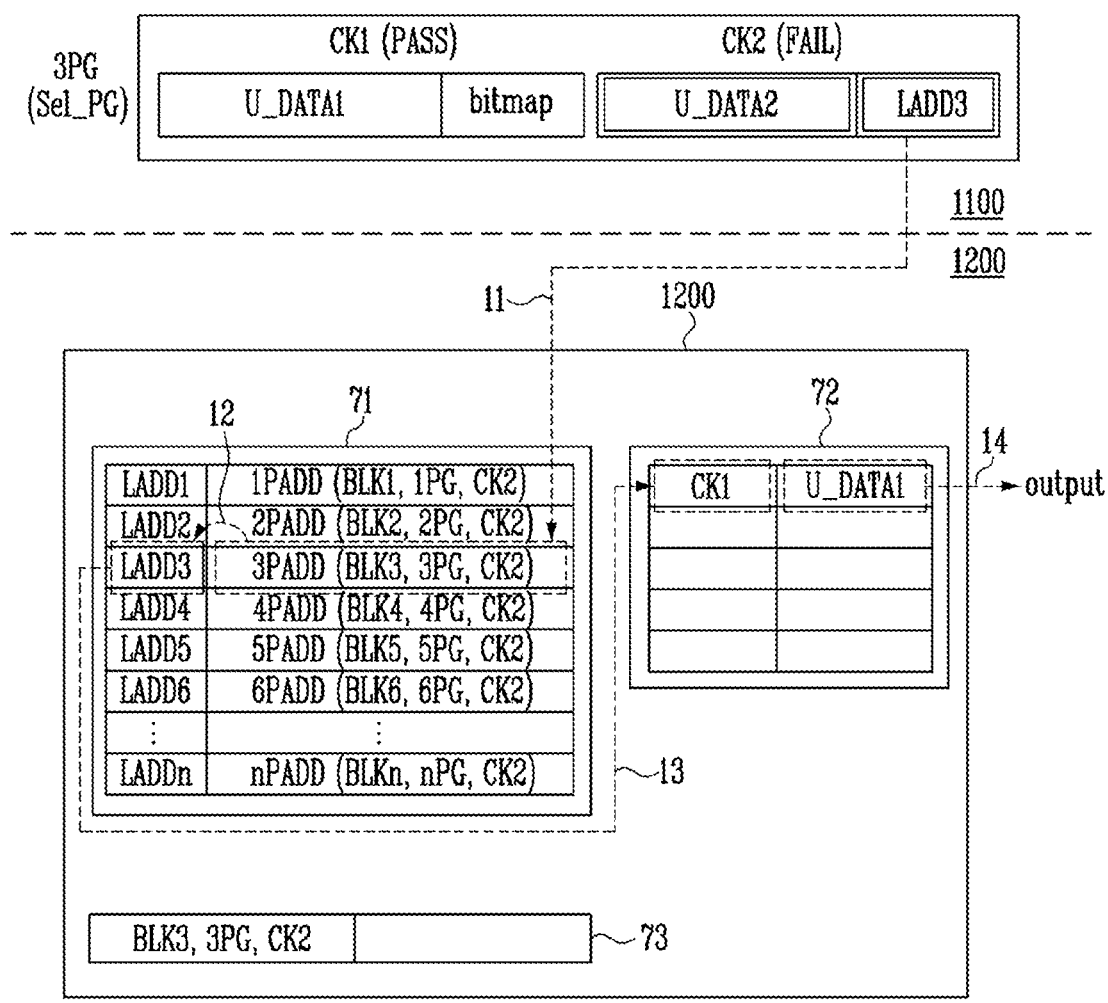
FIG. 10 illustrates operations for recovering meta data according to an embodiment of the present disclosure.

FIG. 10 illustrates operations for recovering meta data according to an embodiment of the present disclosure, and a read operation of a page including two chunks is described as follows.

In the example illustrated in FIG. 10, the third page 3PG is the selected page Sel_PG during the read operation and the third page 3PG is divided into the first and second chunks CK1 and CK2. First user data U_DATA1 and the bitmap may be stored in the first chunk CK1, and second user data U_DATA2 and a third logical address LADD3 may be stored in the second chunk CK2. The bitmap and the third logical address LADD3 stored in the third page 3PG are meta data.

During the read operation of the third page 3PG, when the error correction operation of the first chunk CK1 is passed and the error correction operation of the second chunk CK2 is failed, the recovery manager 440 of FIG. 6 may find the physical address of the second chunk CK2 in the address map buffer 71. For example, when the second chunk CK2 corresponds to a third physical address 3PADD including addresses of the third page 3PG of the third memory block BLK3, the recovery manager 440 may, at step 11, find an entry in the address map buffer 71 that corresponds to the third physical address 3PADD, and then at step 12 find a third logical address LADD3 mapped to the third physical address 3PADD in that entry of the address map buffer 71. Subsequently, at step 13, the recovery manager 440 finds the first chunk CK1, which corresponds to the third logical address LADD3, and on which the error correction operation is passed, in the data buffer 72, and at step 14 outputs the first user data U_DATA1 corresponding to the first chunk CK1.

When the first user data U_DATA1 is output, the recovery manager 440 may store the addresses of the third memory block BLK3 on which the error correction operation has failed, the third page 3PG, and the second chunk CK2 in the error information buffer 73.

Figure 11:
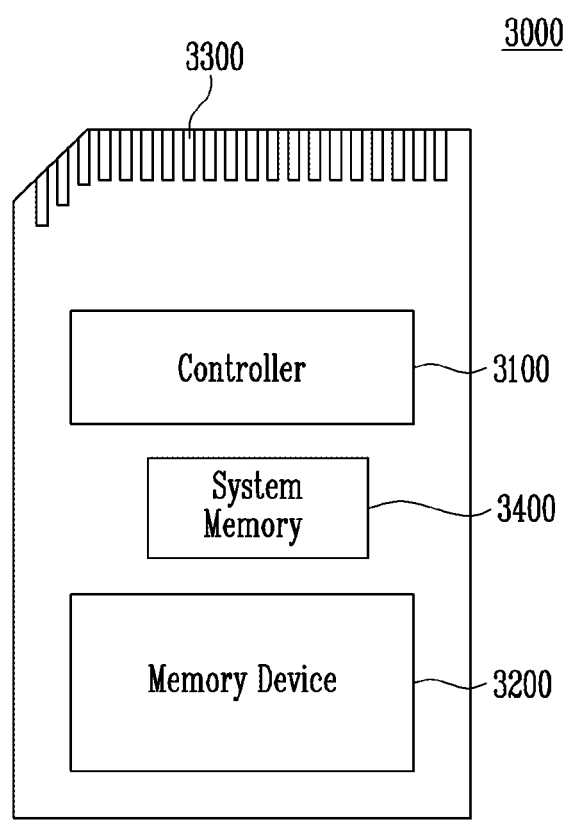
FIG. 11 illustrates a memory card system to which a controller of the present disclosure is applied.

FIG. 11 illustrates a memory card system to which a controller of the present disclosure is applied.

Referring to FIG. 11, the memory card system 3000 may include a controller 3100, a memory device 3200, a connector 3300, and a system memory 3400.

The controller 3100 may control overall operations of the memory card system 3000 and may be configured similarly to the controller 1300 shown in FIG. 6. For example, the controller 3100 may be configured to control the memory device 3200 and the system memory 3400. The controller 3100 may be configured to control a program, read, or erase operation of the memory device 3200 or control operations in a background mode. The controller 3100 is configured to provide an interface between the memory device 3200 and a host. The controller 3100 is configured to drive firmware for controlling the memory device 3200.

For example, the controller 3100 may include components such as a random access memory (RAM), a processor, a host interface, a memory interface, a flash translation layer, and a recovery manager.

The controller 3100 may communicate with an external device through the connector 3300. The controller 3100 may communicate with an external device (for example, the host) according to a specific communication standard. For example, the controller 3100 is configured to communicate with an external device through at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 3300 may be defined by at least one of the various communication standards described above.

For example, the memory device 3200 may be configured of various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-transfer torque magnetic RAM (STT-MRAM).

For example, the system memory 3400 may be configured to include the address map buffer 71, the data buffer 72, and the error information buffer 73 as shown in FIG. 7.

The controller 3100, the memory device 3200, and the system memory 3400 may be integrated into one semiconductor device to configure a memory card. For example, the controller 3100, the memory device 3200, and the system memory 3400 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 12:
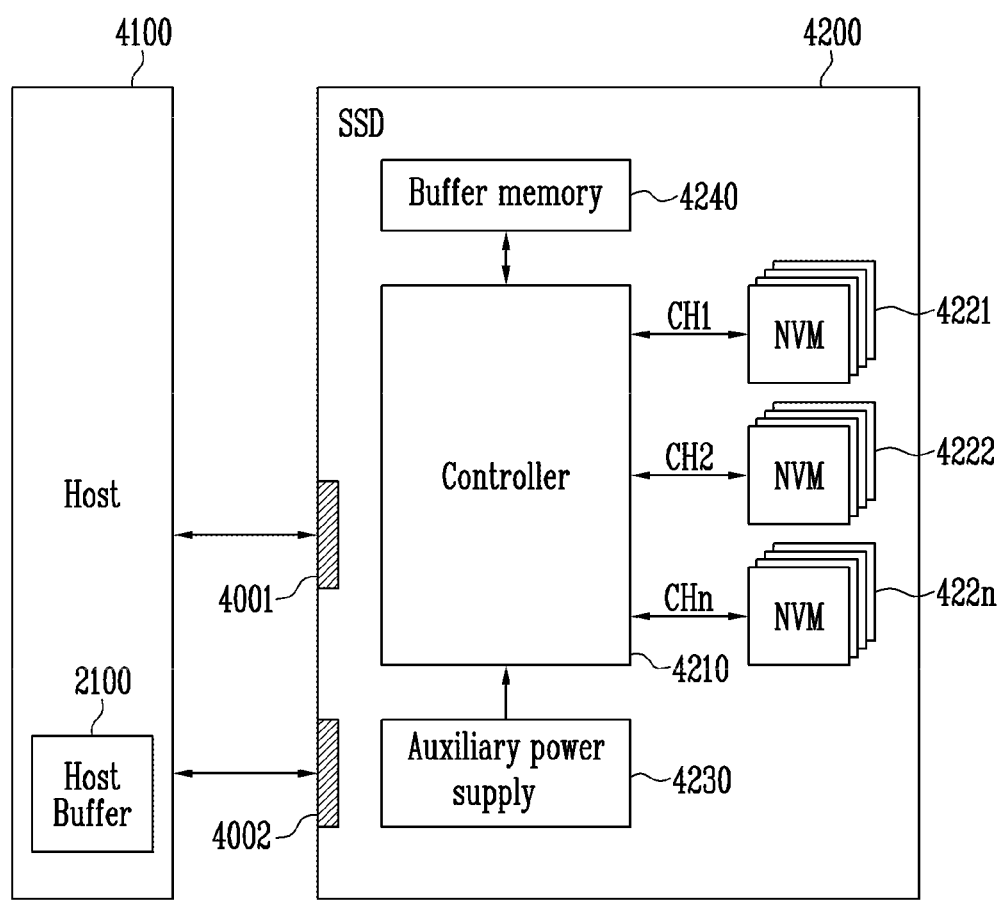
FIG. 12 illustrates a solid state drive (SSD) system to which a controller of the present disclosure is applied.

FIG. 12 illustrates a solid state drive (SSD) system to which a controller of the present disclosure is applied.

Referring to FIG. 12, the SSD system 4000 includes a host 4100 and an SSD 4200. The SSD 4200 exchanges a signal SIG with the host 4100 through a signal connector 4001 and receives power PWR through a power connector 4002. The SSD 4200 includes a controller 4210, a plurality of flash memories 4221 to 422n, an auxiliary power supply 4230, and a buffer memory 4240.

According to an embodiment of the present disclosure, the controller 4210 may perform a function of the controller 1300 described with reference to FIG. 6.

The controller 4210 may control the plurality of flash memories 4221 to 422n in response to the signal received from the host 4100. For example, the signal may be signals based on an interface between the host 4100 and the SSD 4200. For example, the signal may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power supply 4230 is connected to the host 4100 through the power connector 4002. The host 4100 may include a host buffer 2100 and may store a logical address and a physical address in the host buffer 2100. The auxiliary power supply 4230 may be charged by receiving a power voltage from the host 4100. The auxiliary power supply 4230 may provide a power voltage of the SSD 4200 when power supply from the host 4100 is not smooth. For example, the auxiliary power supply 4230 may be positioned in the SSD 4200 or may be positioned outside the SSD 4200. For example, the auxiliary power supply 4230 may be positioned on a main board and may provide auxiliary power to the SSD 4200.

The buffer memory 4240 operates as a buffer memory of the SSD 4200. For example, the buffer memory 4240 may temporarily store data received from the host 4100 or data received from the plurality of flash memories 4221 to 422n, or may temporarily store meta data (for example, a mapping table) of the flash memories 4221 to 422n. In addition, the buffer memory 4240 may temporarily store data read from the memory device, and may store a physical block address of a chunk on which an error correction operation is failed during a read operation.

The buffer memory 4240 may include a volatile memory such as a DRAM, an SDRAM, a DDR SDRAM, and an LPDDR SDRAM, or a nonvolatile memory such as an FRAM, a ReRAM, an STT-MRAM, and a PRAM.

What is claimed is:
1. A memory system comprising:
a memory device including a page storing a first chunk including first user data and first meta data and a second chunk including second user data and second meta data;
a system memory storing an address map table for a physical address of the page in which the first chunk and the second chunk are stored and a logical address mapped to the physical address; and
a controller configured to perform a read operation of the page wherein an error correction operation of the first chunk has failed by:
identifying whether the first meta data of the first chunk includes the logical address mapped to a physical address of the first chunk;
recovering the first meta data using the physical address of the first chunk and the address map table in response to identifying that the logical address was included in the first meta data stored in the first chunk, and
outputting the second user data using the second meta data of the second chunk and using the recovered first meta data, wherein an error correction operation of the second chunk has passed.
2. The memory system of claim 1, wherein the first meta data includes the logical address and the second meta data includes a bitmap for data stored in the page.
3. The memory system of claim 1, wherein the system memory comprises:
an address map buffer configured to store the address map table;
a data buffer configured to store data read from the first chunk, the second chunk, or both; and
an error information buffer configured to store the physical address of the first chunk on which the error correction operation has failed.
4. The memory system of claim 3, wherein the physical address of the page stored in the address map buffer includes an address of a memory block including the page, an address of the page, and an address of the first chunk in which the first meta data is stored, wherein the first meta data includes the logical address.
5. The memory system of claim 1, wherein the controller comprises:
a flash translation layer configured to generate the address map table by mapping the physical address of the page and the logical address to each other, and to store the address map table in the system memory;
an error correction circuit configured to perform the error correction operation on data received from the memory device;

a recovery circuit configured to recover the first meta data of the first chunk using the physical address of the first chunk and the address map table stored in the system memory, when a fail signal is output from the error correction circuit; and a central processing unit configured to control the flash translation layer, the error correction circuit, and the recovery circuit, and to generate a program command, read command, erase command, or combinations thereof.

6. The memory system of claim 5, wherein the flash translation layer is configured to perform garbage collection, wear leveling, or both, using the recovered first meta data.

7. The memory system of claim 5, wherein the recovery circuit is configured to perform an operation of recovering the first meta data when the logical address was included in the first meta data stored in the first chunk on which the error correction operation has failed, and process a read operation of the page as failed when the logical address was not included in the first meta data stored in the first chunk on which the error correction operation has failed.

8. The memory system of claim 7, wherein the recovery circuit is configured to find the logical address mapped to the physical address of the first chunk on which the error correction operation is failed in the system memory, and output the second user data corresponding to the second chunk on which the error correction operation has passed, to be stored among read data in the system memory, when the logical address was included in the first meta data stored in the first chunk on which the error correction operation has failed.

9. The memory system of claim 8, wherein the recovery circuit is configured to store the physical address of the first chunk on which the error correction operation has failed in the system memory.

10. The memory system of claim 8, wherein the read data stored in the system memory is data read from the first and second chunks.

11. A method of operating a memory system, the method comprising:

reading data of a selected page of a memory device and outputting read data as a plurality of chunks;

performing an error correction operation on each of the plurality of chunks;

determining that an error correction operation on a first chunk of the plurality of chunks has failed in response to detecting that a number of error bits included in the first chunk is greater than an allowed number of error bits;

identifying whether meta data of the first chunk includes a logical address mapped to a physical address of the first chunk;

determining whether to proceed with a recovery operation on the meta data of the first chunk based on a result of the identifying; and in response to determining to proceed with the recovery operation:

detecting the logical address mapped to the physical address of the first chunk from an address map table; and outputting, based on the logical address, data corresponding to a second chunk of the plurality of chunks, wherein an error correction operation on the second chunk has passed before outputting the data corresponding to the second chunk.

12. The method of claim 11, wherein determining whether to proceed with the recovery operation comprises:

determining to proceed with the recovery operation in response to detecting that the logical address was stored in the meta data of the first chunk, or determining to not proceed with the recovery operation in response to detecting that the logical address was not stored in the meta data of the first chunk.

13. The method of claim 11, wherein the recovery operation on the meta data comprises:

finding a table physical address corresponding to the physical address of the first chunk in the address map table in which the logical address and the physical address are mapped to each other;

detecting the logical address mapped to the physical address from the address map table in response to detecting that the table physical address corresponding to the physical address of the first chunk is included in the address map table; and recovering meta data by combining the detected logical address with meta data included in the read data.

14. The method of claim 13, wherein in response to determining to proceed with the recovery operation, the method:

outputs the data corresponding to the second chunk using the recovered meta data, and does not output data corresponding to the first chunk.

15. The method of claim 11, further comprising:

storing the physical address of the first chunk after the data corresponding to the second chunk is output.

16. A method of operating a memory system, the method comprising:

generating and storing an address map table by mapping physical addresses for regions in which data is to be programmed to logical addresses during a program operation;

programming the data in a selected page of a memory block selected according to the physical addresses;

reading a plurality of chunks of the selected page and performing an error correction operation on each chunk of the plurality of read chunks, in response to detecting that a read operation of the selected page is performed; and in response to detecting that an error correction operation on a first chunk of the plurality of chunks has failed:

checking whether a logical address was included in first meta data stored in the first chunk;

detecting the logical address mapped to a physical address of the first chunk in the address map table, in response to detecting that the logical address was included in the first meta data stored in the first chunk; and recovering meta data for the data programmed in the selected page by combining the detected logical address with remaining meta data stored in a second chunk of the plurality of chunks in response to detecting that an error correction operation on the second chunk has passed.

17. The method of claim 16, wherein during the program operation, data to be programmed to the selected page and meta data to be programmed to the selected page are divided according to a number of chunks included in the selected page and programmed to the plurality of chunks.

18. The method of claim 17, wherein when the meta data is divided according to the number of chunks, the logical address included in the first meta data is stored in one chunk designated in advance among the plurality of chunks.

19. The method of claim 16, further including:

in response to detecting that the error correction operation on the first chunk of the plurality of chunks has failed and the logical address was not included in the first meta data stored in the first chunk, processing the read operation of the selected page as a fail.

\* \* \* \* \*